US012447826B2

(12) United States Patent
Gariepy et al.

(10) Patent No.: US 12,447,826 B2
(45) Date of Patent: Oct. 21, 2025

(54) SYSTEM AND METHOD FOR CONTROLLING AN AIRCRAFT ELECTRICAL DISTRIBUTION SYSTEM

(71) Applicant: Pratt & Whitney Canada Corp., Longueuil (CA)

(72) Inventors: Raphael Gariepy, Montreal (CA); Simon Lam, Scarborough (CA); Remi Robache, Montreal (CA); Antwan Shenouda, Mississauga (CA); Richard Freer, St-Basile-le-Grand (CA); Ninad Joshi, Brampton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 282 days.

(21) Appl. No.: 18/123,266

(22) Filed: Mar. 18, 2023

(65) Prior Publication Data
US 2024/0308350 A1 Sep. 19, 2024

(51) Int. Cl.
*B60L 3/04* (2006.01)
*B60L 3/00* (2019.01)
*B64D 27/24* (2024.01)

(52) U.S. Cl.
CPC .............. *B60L 3/04* (2013.01); *B60L 3/0046* (2013.01); *B64D 27/24* (2013.01); *B64D 2221/00* (2013.01)

(58) Field of Classification Search
CPC ..... B60L 3/0046; B60L 3/04; B64D 2221/00; B64D 27/24; H02J 2310/44; H02J 7/0013; H02J 7/0031; H02J 7/34
See application file for complete search history.

(56) References Cited

U.S. PATENT DOCUMENTS

| | | | | |
|---|---|---|---|---|
| 10,449,868 | B2 * | 10/2019 | Hale | G05F 1/462 |
| 10,500,980 | B2 * | 12/2019 | Conlon | H02J 3/322 |
| 10,693,300 | B2 * | 6/2020 | Snyder | H02J 7/0024 |
| 10,811,869 | B2 * | 10/2020 | Pevear | H01M 10/425 |
| 11,031,793 | B2 * | 6/2021 | Hinterberger | H01M 50/50 |
| 11,990,777 | B2 * | 5/2024 | Woll | B60L 58/21 |
| 2017/0207637 | A1 * | 7/2017 | Sugeno | H02J 7/0013 |
| 2019/0283611 | A1 * | 9/2019 | Conlon | H02J 3/322 |

(Continued)

OTHER PUBLICATIONS

EP Search Report for EP Patent Application No. 24164306.3 dated Aug. 8, 2024.

*Primary Examiner* — Tyler J Lee
(74) *Attorney, Agent, or Firm* — Getz Balich LLC

(57) ABSTRACT

An assembly for an aircraft includes an aircraft electrical distribution bus, a battery, and a control system. The battery includes a plurality of battery strings. Each battery string includes a string contactor. The control system is in signal communication with the string contactor of each battery string. The control system is configured to control a position of the string contactor of each battery string in a closed string position or an open string position. The control system is configured to: detect a fault in a faulted first battery string of the plurality of battery strings and position the string contactor of the faulted first battery string in the open string position, in response to the detected fault in the faulted first battery string and maintain the string contactor of at least one unfaulted second battery string of the plurality of battery strings in the closed string position.

17 Claims, 5 Drawing Sheets

(56) References Cited

U.S. PATENT DOCUMENTS

| | | |
|---|---|---|
| 2022/0045525 A1 | 2/2022 | Woll |
| 2022/0055483 A1* | 2/2022 | Wang ...................... B60L 58/10 |
| 2022/0069605 A1 | 3/2022 | Trela |
| 2022/0115878 A1 | 4/2022 | Khozikov |
| 2022/0255335 A1 | 8/2022 | Khozikov |
| 2022/0402364 A1* | 12/2022 | Khozikov .............. B64D 31/16 |

* cited by examiner

SYSTEM AND METHOD FOR CONTROLLING AN AIRCRAFT ELECTRICAL DISTRIBUTION SYSTEM

TECHNICAL FIELD

This disclosure relates generally to aircraft electrical distribution systems and, more particularly, to systems and methods for controlling an aircraft electrical distribution system including a plurality of battery strings electrically connected in parallel.

BACKGROUND OF THE ART

Aircraft may include one or more batteries for supplying electrical power for an electrical distribution system of the aircraft and/or its propulsion system(s). The electrical connection of the battery to the electrical distribution system may, under some conditions, be controlled to electrically isolate the one or more batteries from the electrical distribution system. Various systems and methods for controlling aircraft batteries are known in the art. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft includes an aircraft electrical distribution bus, a battery, and a control system. The battery includes a plurality of battery strings and a main battery contactor. The plurality of battery strings are electrically connected in parallel. Each battery string includes a string contactor. The string contactor is positionable in a closed string position or an open string position. The string contactor in the closed string position is configured to direct electrical power from the respective battery string to the aircraft electrical distribution bus. The string contactor in the open string position configured to electrically isolate the respective battery string from the aircraft electrical distribution bus. The main battery contactor is electrically connected in series with the string contactor of each battery string. The main battery contactor is positionable in a closed battery position or an open battery position. The main battery contactor in the closed battery position is configured to direct electrical power from the battery to the aircraft electrical distribution bus. The main battery contactor in the open battery position is configured to electrically isolate the battery from the aircraft electrical distribution bus. The control system is in signal communication with the string contactor of each battery string. The control system is configured to control a position of the string contactor of each battery string in the closed string position or the open string position. The control system includes a processor in communication with a non-transitory memory storing instructions, which instructions when executed by the processor, cause the processor to: detect a fault in a faulted first battery string of the plurality of battery strings and position the string contactor of the faulted first battery string in the open string position, in response to the detected fault in the faulted first battery string, and maintain the string contactor of at least one unfaulted second battery string of the plurality of battery strings in the closed string position.

In any of the aspects or embodiments described above and herein, control of a position of the main battery contactor in the closed battery position and the open battery position may be independent of the control system.

In any of the aspects or embodiments described above and herein, the instructions, when executed by the processor, may further cause the processor to determine an electrical loading limit for the at least one unfaulted second battery string with the string contactor of the faulted first battery string in the open string position.

In any of the aspects or embodiments described above and herein, the instructions, when executed by the processor, may further cause the processor to generate a warning identifying the determined electrical loading limit.

In any of the aspects or embodiments described above and herein, the assembly may further include a thermal management system for the battery. The thermal management system may be configured to direct a cooling medium to each battery string of the plurality of battery strings. The instructions, when executed by the processor, may further cause the processor to control the thermal management system to increase a flow rate of the cooling medium to the at least one unfaulted second battery string in response to detection of the fault in a faulted first battery string.

In any of the aspects or embodiments described above and herein, the instructions, when executed by the processor, may further cause the processor to decrease an electrical loading of the aircraft electrical distribution bus in response to detection of the fault in a faulted first battery string.

In any of the aspects or embodiments described above and herein, each battery string may include a plurality of battery modules electrically connected in series.

According to another aspect of the present disclosure, a method for operating an electrical distribution system for an aircraft is provided. The method includes supplying electrical power to an aircraft electrical distribution bus with a battery. The battery includes a plurality of battery strings and a main battery contactor. Each battery string includes a string contactor electrically connected in series with the main battery contactor. The method further includes detecting a fault in at least one faulted first battery string of the plurality of battery strings and positioning the string contactor of the faulted first battery string in an open string position, in response to the detected fault in the faulted first battery string and maintaining the string contactor of at least one unfaulted second battery string of the plurality of battery strings in a closed string position.

In any of the aspects or embodiments described above and herein, the plurality of battery strings may be electrically connected in parallel.

In any of the aspects or embodiments described above and herein, the method may further include determining, with a control system, an electrical loading limit for the at least one unfaulted second battery string with the string contactor of the at least one faulted first battery string in the open string position.

In any of the aspects or embodiments described above and herein, the method may further include generating, with the control system, a warning identifying the determined electrical loading limit.

In any of the aspects or embodiments described above and herein, the method may further include decreasing, with the control system, an electrical loading of the aircraft electrical distribution bus in response to detection of the fault in a faulted first battery string.

According to another aspect of the present disclosure, an assembly for an aircraft includes an aircraft electrical distribution bus, an aircraft propulsion system, a battery, and a control system. The aircraft propulsion system includes a rotational assembly. The rotational assembly includes a rotatable shaft and an electric motor. The electric motor is connected in electrical communication with the aircraft electrical distribution bus and configured to selectively drive the rotatable shaft. The battery includes a plurality of battery strings and a main battery contactor. Each battery string includes a string contactor. The string contactor is positionable in a closed string position or an open string position. The main battery contactor electrically connected in series with the string contactor of each battery string. The main battery contactor is positionable in a closed battery position or an open battery position. The control system is in signal communication with the string contactor of each battery string. The control system is configured to control a position of the string contactor of each battery string in the closed string position or the open string position. The control system includes a processor in communication with a non-transitory memory storing instructions, which instructions when executed by the processor, cause the processor to: detect a fault in a faulted first battery string of the plurality of battery strings and position the string contactor of the faulted first battery string in the open string position, in response to the detected fault in the faulted first battery string, and maintain the string contactor of at least one unfaulted second battery string of the plurality of battery strings in the closed string position.

In any of the aspects or embodiments described above and herein, the instructions, when executed by the processor, may further cause the processor to determine an electrical loading limit for the at least one unfaulted second battery string with the string contactor of the faulted first battery string in the open string position.

In any of the aspects or embodiments described above and herein, the instructions, when executed by the processor, may further cause the processor to control the electric motor to decrease an electrical loading of the electric motor in response to detection of the fault in the faulted first battery string.

In any of the aspects or embodiments described above and herein, the propulsion system may include a gas turbine engine. The gas turbine engine may include the rotational assembly. The instructions, when executed by the processor, may further cause the processor to control the gas turbine engine to increase an engine power of the gas turbine engine in response to detection of the fault in a faulted first battery string.

In any of the aspects or embodiments described above and herein, the rotational assembly may further include a propeller. The electric motor may be configured to selectively drive the propeller via the rotatable shaft.

In any of the aspects or embodiments described above and herein, the gas turbine engine may include a generator connected in electrical communication with the aircraft electrical distribution bus.

In any of the aspects or embodiments described above and herein, the gas turbine engine may include a second rotational assembly including a second rotatable shaft, a bladed turbine rotor, and a bladed compressor rotor. The second rotatable shaft may interconnect the bladed turbine rotor and the bladed compressor rotor. The bladed turbine rotor may be configured to drive the generator via the second rotatable shaft.

In any of the aspects or embodiments described above and herein, each battery string of the plurality of battery strings may include a plurality of battery modules electrically connected in series and the plurality of battery strings may be electrically connected in parallel.

The present disclosure, and all its aspects, embodiments and advantages associated therewith will become more readily apparent in view of the detailed description provided below, including the accompanying drawings.

DETAILED DESCRIPTION

Figure 1:
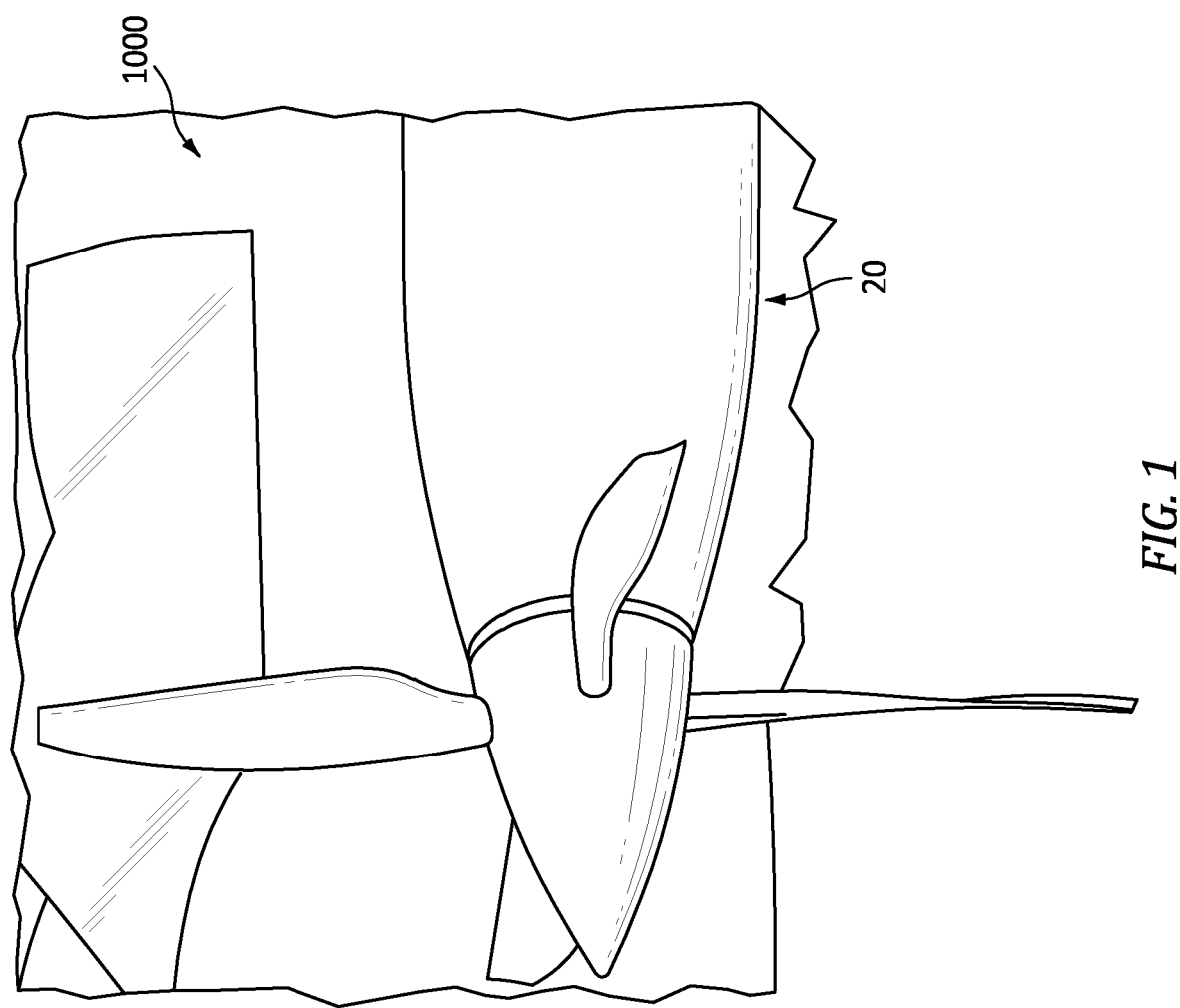
FIG. 1 illustrates a perspective view of a portion of an aircraft including a propulsion system, in accordance with one or more embodiments of the present disclosure.
Figure 2:
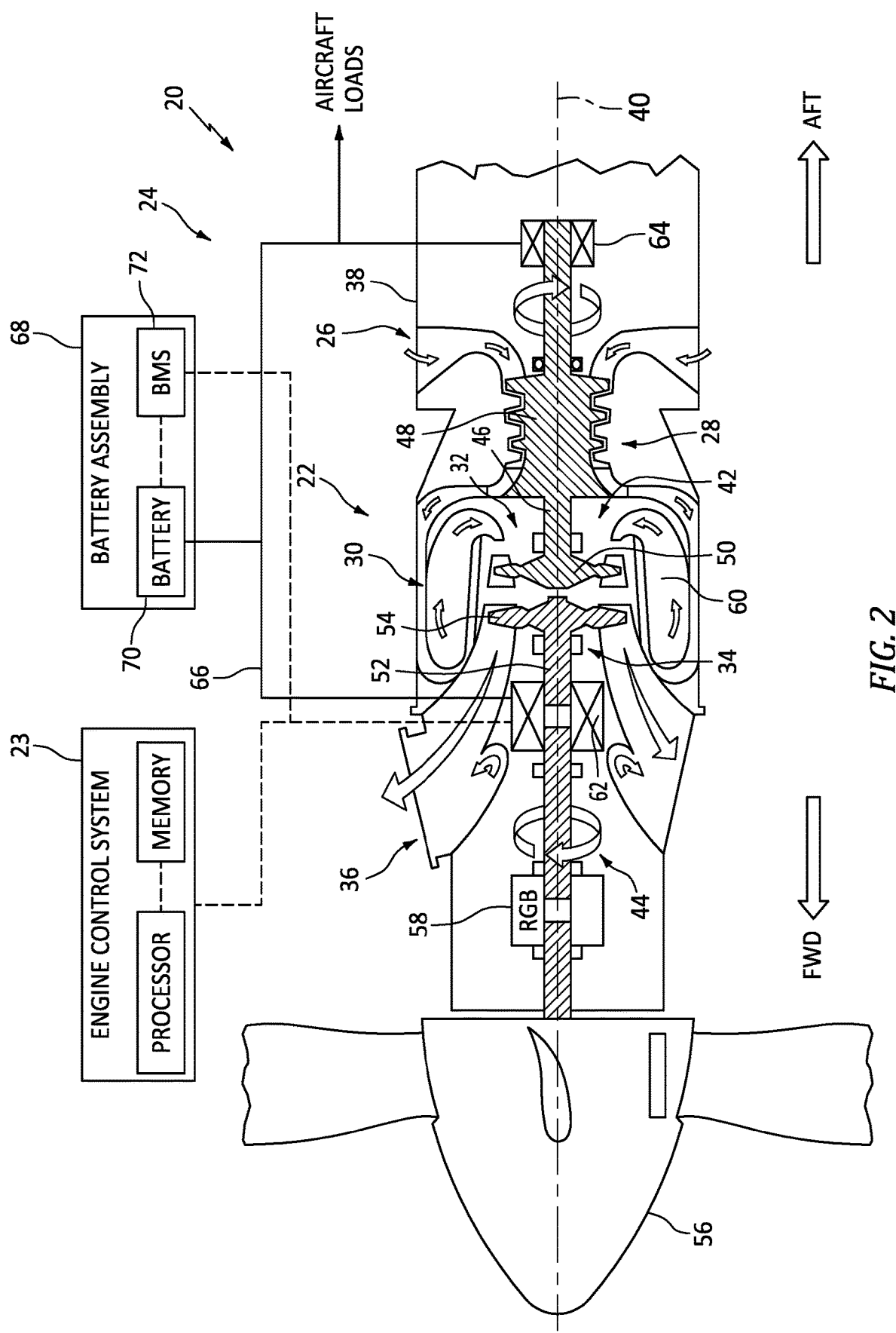
FIG. 2 schematically illustrates a side view of an aircraft propulsion system including a gas turbine engine, in accordance with one or more embodiments of the present disclosure.

FIGS. 1 and 2 illustrate a propulsion system 20 configured for an aircraft, such as the aircraft 1000 of FIG. 1. Briefly, the aircraft may be a fixed-wing aircraft (e.g., an airplane), a rotary-wing aircraft (e.g., a helicopter), a tilt-rotor aircraft, a tilt-wing aircraft, or any other aerial vehicle. Moreover, the aircraft may be a manned aerial vehicle or an unmanned aerial vehicle (UAV, e.g., a drone). The aircraft propulsion system 20 of FIG. 2 includes a gas turbine engine 22 and an engine control system 23. However, the present disclosure is also applicable to propulsion systems which do not include gas turbine engines such as, but not limited to, a battery-electric propulsion system (e.g., an electric-motor driven propeller system). The propulsion system 20 additionally includes or is otherwise electrically connected to an electrical distribution system 24.

FIG. 2 illustrates a side, cutaway view of the propulsion system 20 illustrating the gas turbine engine 22 and the electrical distribution system 24. The gas turbine engine 22 of FIG. 2 is configured as a hybrid-electric, multi-spool turboprop gas turbine engine. However, it should be understood that aspects of the present disclosure may be equally applicable to other configurations of gas turbine engines such as, but not limited to, a turboshaft gas turbine engine, a turboprop gas turbine engine, a turbojet gas turbine engine, a propfan gas turbine engine, an open rotor gas turbine engine, an auxiliary power unit (APU), or the like.

The gas turbine engine 22 of FIG. 2 includes an air inlet 26, a compressor 28, a combustor 30, a high-pressure turbine 32, a power turbine 34, an exhaust 36, and an engine static structure 38. The air inlet 26, the compressor 28, the combustor 30, the high-pressure turbine 32, the power turbine 34, and the exhaust 36 are arranged sequentially along an axial centerline 40 (e.g., a rotational axis) of the gas turbine engine 22. The engine static structure 38 may include, for example, one or more engine cases for the gas turbine engine 22. The engine static structure 38 may additionally include cowlings, bearing assemblies, and/or other structural components of the gas turbine engine 22. The one or more engine cases form, house, and/or structurally support one or more of the air inlet 26, the compressor 28, the combustor 30, the high-pressure turbine 32, the power turbine 34, and the exhaust 36.

Components of the gas turbine engine 22 of FIG. 2, such as components of the compressor 28, the high-pressure turbine 32, and the power turbine 34, are arranged as a first rotational assembly 42 (e.g., a high-pressure spool) and a second rotational assembly 44 (e.g., a power spool). The first rotational assembly 42 and the second rotational assembly 44 are mounted for rotation about the axial centerline 40 relative to the engine static structure 38. The gas turbine engine 22 of FIG. 2 has a "free turbine" configuration in which power for aircraft propulsion is extracted by the second rotational assembly 44 downstream of (e.g., from the exhaust of) the first rotational assembly 42. The present disclosure, however, is not limited to free turbine gas turbine engine configurations.

The first rotational assembly 42 includes a first shaft 46, a bladed compressor rotor 48 for the compressor 28, and a bladed turbine rotor 50 for the high-pressure turbine 32. The first shaft 46 interconnects the bladed compressor rotor 48 and the bladed turbine rotor 50. The second rotational assembly 44 includes a second shaft 52, a bladed power turbine rotor 54 for the power turbine 34, and a propeller 56. The second shaft 52 is connected to the bladed power turbine rotor 54. The second shaft 52 may be directly or indirectly connected to the propeller 56. For example, the second shaft 52 may be configured to rotatably drive the propeller 56 via a reduction gear box (RGB) 58. The second rotation assembly 44 may include additional components (e.g., a propeller input shaft) for interconnecting the second shaft 52 with the bladed power turbine rotor 54 and the propeller 56. The RGB 58 may be configured to drive the propeller 56 at a reduced rotational speed relative to the second shaft 52. Alternatively, the second shaft 52 may directly interconnect the bladed power turbine rotor 54 and the propeller 56.

During operation of the gas turbine engine 22 of FIG. 2, ambient air enters the gas turbine engine 22 through the air inlet 26 and is directed into the compressor 28. The ambient air is compressed by the bladed compressor rotor 48 and directed into a combustion chamber 60 of the combustor 30. Fuel is injected into the combustion chamber 60 and mixed with the compressed air to provide a fuel-air mixture. This fuel-air mixture is ignited, and combustion products thereof flow through and sequentially cause the bladed turbine rotor 50 and the bladed power turbine rotor 54 to rotate. The rotation of the bladed turbine rotor 50 and the bladed power turbine rotor 54 respectively drive rotation of the first rotational assembly 42 and the second rotational assembly 44. Rotation of the second rotational assembly 44 further drives rotation of the propeller 56 to provide propulsion (e.g., thrust) for the propulsion system 20 and the aircraft 1000 (see FIG. 1). Combustion exhaust gas flowing past the bladed power turbine rotor 54 along is directed out of the gas turbine engine 22 through the exhaust 36.

The electrical distribution system 24 of FIG. 2 is configured to supply electrical power for electrical loads of the propulsion system 20 and/or the aircraft 1000 (see FIG. 1). Examples of electrical loads for the aircraft 1000 include, but are not limited to, electronic control systems, environmental control systems, electric motors, lighting systems, communication systems, and the like. The electrical distribution system 24 of FIG. 2 includes an electric motor 62, a generator 64, an electrical distribution bus 66, and a battery assembly 68. The present disclosure, however, is not limited to the particular configuration of the electrical distribution system 24 of FIG. 2.

The electric motor 62 is configured to apply a rotational force to second rotational assembly 44. For example, the electric motor 62 may be directly or indirectly coupled to the second shaft 52 to drive the second shaft 52 by applying a rotational force to the second shaft 52. The electric motor 62 may further include a clutch configured to selectively couple the electric motor 62 to the second shaft 52 or to an intermediate component of the second rotational assembly 44. Accordingly, the electric motor 62 may be configured to apply a rotational force to the second rotational assembly 44 to facilitate rotation of the propeller 56 by the second rotational assembly 44. For example, the electric motor 62 in combination with the bladed power turbine rotor 54 may provide the rotational force for driving the propeller 56. In other words, the electric motor 62 may share the mechanical load (e.g., rotational load) of the propeller 56 with the gas turbine engine 22. The electric motor 62 may be selected to be sufficiently powerful to drive the propeller 56 during all flight conditions independent of the bladed power turbine rotor 54. Accordingly, the electric motor 62 may provide all of the rotational force for driving the propeller 56. The electric motor 62 is electrically connected to the electrical distribution bus 66 and configured to receive electrical power from the electrical distribution bus 66 for operation of the electric motor 62.

The generator 64 is configured to supply electrical power to the electrical distribution system 24. The generator 64 of FIG. 2 is operably coupled to the first shaft 46. For example, the generator 64 may be operably coupled to the first shaft 46 by an accessory gear box (not shown) or other speed-reducing gear assembly. The first shaft 46 drives rotation of the generator 64 to generate electrical power for the electrical distribution system 24. The generator 64 is connected in electrical communication with the electrical distribution bus 66 to supply electrical power to the electrical distribution bus 66 for electrical loads of the propulsion system 20 and/or the aircraft 1000 (see FIG. 1). The present disclosure is not limited to the particular generator 64 configuration of FIG. 2. For example, the generator 64 may alternatively be operably coupled to and driven by the second shaft 52. Moreover, electrical power for the electrical distribution system 24 may additionally or alternatively be provided by other electrical power sources which are independent of the propulsion system 20 such as, but not limited to, a generator of another propulsion system (e.g., for multi-propulsion-system aircraft), an auxiliary power unit (APU), a fuel cell (e.g., hydrogen fuel cell) assembly, or another power source disposed on the aircraft 1000 or otherwise outside of the propulsion system 20, and/or a ground-based power supply (e.g., an airport electrical distribution system, generator, or other electrical power supply or battery charging device) external to the aircraft 1000.

Figure 3:
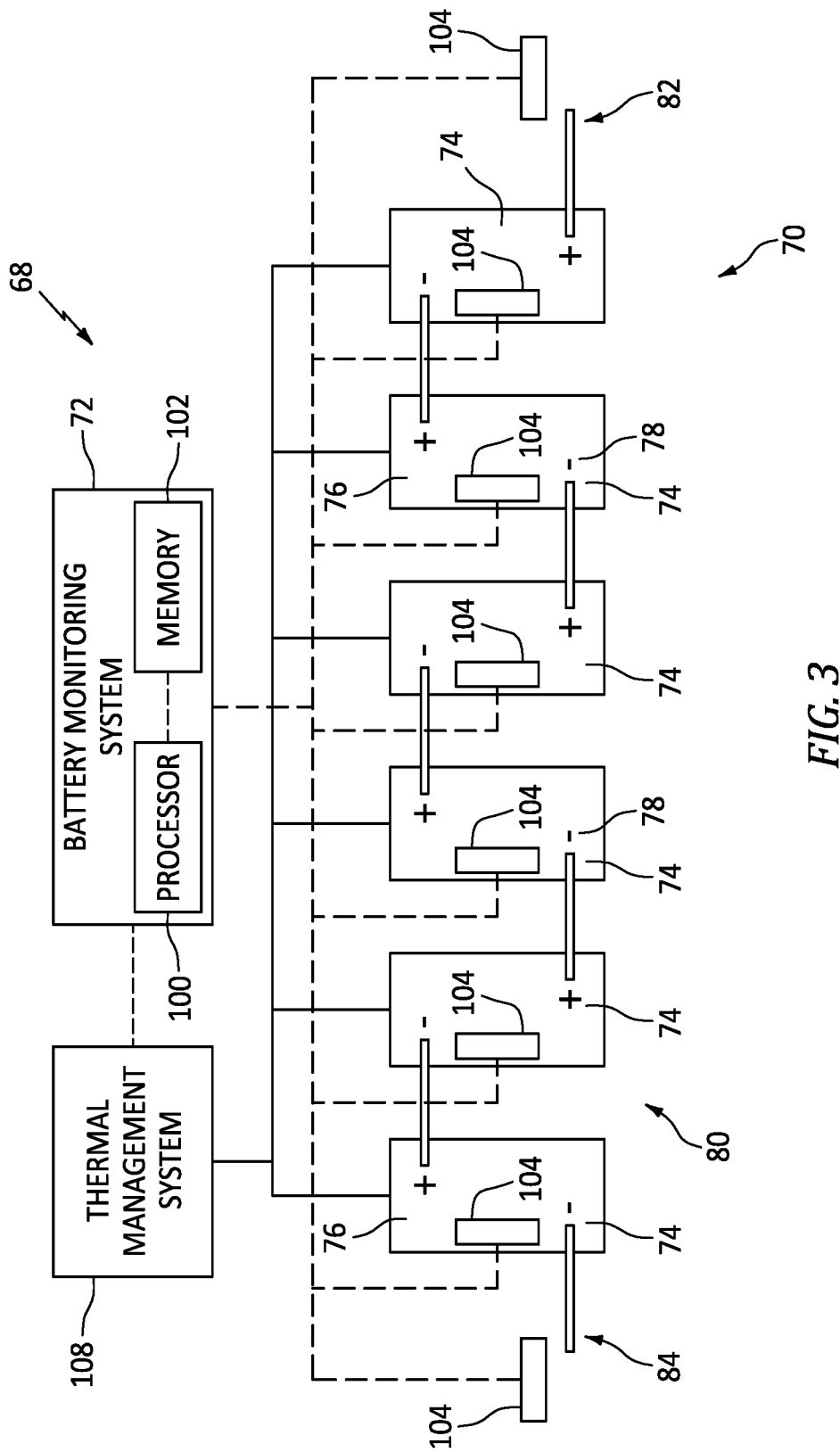
FIG. 3 schematically illustrates portion of a battery assembly including a battery string, in accordance with one or more embodiments of the present disclosure.
Figure 4:
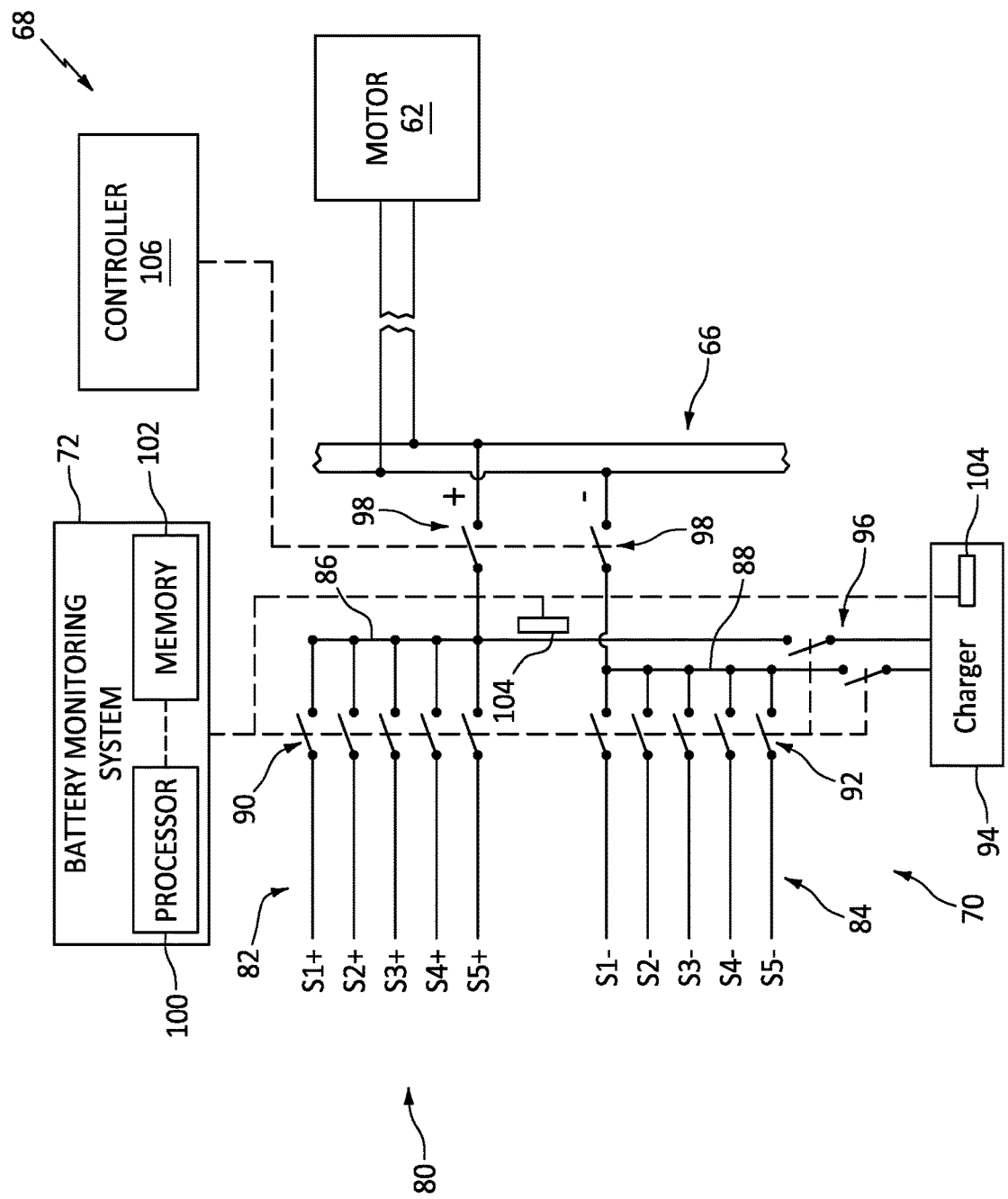
FIG. 4 schematically illustrates another portion of a battery assembly including a plurality of battery strings electrically connected in parallel, in accordance with one or more embodiments of the present disclosure.

Referring to FIGS. 3 and 4, the battery assembly 68 includes a battery 70, a battery monitoring system (BMS) 72, and a battery thermal management system 108. The battery 70 is configured to selectively supply electrical power to the electrical distribution bus 66 independently (e.g., as a single power source for the electrical distribution bus 66) or in combination with the generator 64 and/or other power sources. The electrical distribution bus 66 of FIG. 4 is illustrated as being electrically connected with the electric motor 62 to supply electrical power to the electric motor 62.

Of course, the electrical distribution bus 66 may be configured to provide power to additional and/or alternative electrical loads. The battery 70 may be disposed, for example, in the aircraft 1000 and/or its propulsion systems 20. The battery 70 of FIG. 3 includes a plurality of battery modules 74 (e.g., battery packs). Each battery module 74 may include a plurality of discrete battery cells electrically connected together (e.g., using series and/or parallel electrical connections) to form the battery module 74. The present disclosure, however, is not limited to this particular configuration of the battery modules 74. The battery modules 74 (e.g., and their battery cells) are configured as rechargeable batteries having battery chemistries such as, but not limited to, lead acid, nickel cadmium (NiCd), nickel-metal hydride (Ni-MH), lithium-ion (Li-ion), lithium-polymer (Li-poly), lithium metal, and the like. Each battery module 74 includes a positive electrode 76 (e.g., an anode) and a negative electrode 78 (e.g., a cathode).

FIG. 3 schematically illustrates a group of the battery modules 74 electrically connected in series to form a battery string 80 of the battery 70. For example, each battery module 74 of the battery string 80 of FIG. 3 is electrically connected in series (e.g., positive to negative or negative to positive) to one or more other battery modules 74 of the battery string 80 of FIG. 3. The battery string 80 includes a positive string terminal 82 and a negative string terminal 84 for connecting the battery string 80 in electrical communication with other portions of the battery 70. The battery string 80 of FIG. 3 includes six (6) battery modules 74 electrically connected in series. The present disclosure, however, is not limited to any particular number of battery modules 74 for the battery string 80. Moreover, the battery modules 74 of the battery string 80 may be electrically connected together using series and/or parallel electrical connections as necessary to configure the battery string 80 with the desired electrical characteristics (e.g., voltage output, power output, etc.) for the battery string 80.

FIG. 4 schematically illustrates a portion of the battery assembly 68 in which the battery 70 includes a plurality of the battery strings 80. The plurality of battery strings 80 of FIG. 4 includes five (5) battery strings S1-5 electrically connected together in parallel. For example, the positive string terminals 82 (e.g., S1+, S2+, S3+, S4+, S5+) of the battery strings 80 of FIG. 4 are electrically connected together at a positive battery terminal 86 and the negative string terminals 84 (e.g., S1−, S2−, S3−, S4−, S5−) are electrically connected together at a negative battery terminal 88.

Each battery string 80 of FIG. 4 includes a positive string contactor 90 and a negative string contactor 92. The positive string contactor 90 for each battery string 80 is disposed at (e.g., on, adjacent, or proximate) the respective positive string terminal 82 or otherwise electrically between the respective positive string terminal 82 and the positive battery terminal 86. The positive string contactor 90 is selectively positionable in a closed position or an open position. In the closed position, the positive string contactor 90 is configured to convey electrical current between the positive battery terminal 86 and the respective positive string terminal 82. In the open position, the positive string contactor 90 is configured to interrupt (e.g., obstruct, prevent, etc.) electrical current between the positive battery terminal 86 and the respective positive string terminal 82. The negative string contactor 92 for each battery string 80 is disposed at (e.g., on, adjacent, or proximate) the respective negative string terminal 84 or otherwise electrically between the respective negative string terminal 84 and the negative battery terminal 88. The negative string contactor 92 is selectively positionable in a closed position or an open position. In the closed position, the negative string contactor 92 is configured to convey electrical current between the negative battery terminal 88 and the respective negative string terminal 84. In the open position, the negative string contactor 92 is configured to interrupt (e.g., obstruct, prevent, etc.) electrical current between the negative battery terminal 88 and the respective negative string terminal 84. Accordingly, the positive string contactor 90 and the negative string contactor 92 may be controlled to selectively electrically connect or selectively electrically disconnect the respective battery string 80 from the battery terminals 86, 88 and/or the electrical distribution bus 66. The positive string contactor 90 and the negative string contactor 92 may be configured as electrically-controlled relays or switches which may be controlled by an electrical control signal to position the respective positive string contactor 90 and negative string contactor 92 in the closed position or the open position. While each battery string 80 of FIG. 4 includes both the positive string contactor 90 and the negative string contactor 92, the present disclosure is not limited to the use of both the positive string contactor 90 and the negative string contactor 92 for the battery string 80 (e.g., the battery string 80 may include the positive string contactor 90 or the negative string contactor 92). Of course, the battery 70 may alternatively include other selective electrical power interruption devices such as, but not limited to electrical circuit breakers or electrical switches.

The battery 70 of FIG. 4 further includes a charger 94, main charger contactors 96 (e.g., a positive contactor and a negative contactor), and main battery contactors 98 (e.g., a positive contactor and a negative contactor). The charger 94 is an electrical power source configured to supply electrical power to the battery terminals 86, 88 for charging one or more of the battery strings 80 (e.g., the battery strings S1, S2, S3, S4, and/or S5 of FIG. 4). The charger 94 may be formed by or may otherwise include one or more electrical power sources such as, but not limited to, the generator 64, a generator of another propulsion system (e.g., for multi-propulsion-system aircraft), an auxiliary power unit (APU), a fuel cell (e.g., hydrogen fuel cell) assembly, or another power source disposed on the aircraft 1000 or otherwise outside of the propulsion system 20, and/or a ground-based power supply (e.g., an airport electrical distribution system, generator, or other electrical power supply or battery charging device) external to the aircraft 1000. The main charger contactors 96 are configured to selectively connect the charger 94 in electrical communication with the battery 70 (e.g., with the positive battery terminal 86 and the negative battery terminal 88). The main battery contactors 98 are configured to selectively connect the electrical distribution bus 66 in electrical communication with the battery 70 (e.g., with the positive battery terminal 86 and the negative battery terminal 88). Each of the main charger contactors 96 and the main battery contactors 98 is selectively positionable in a closed position or an open position. In the closed position, each of the main charger contactors 96 and the main battery contactors 98 is configured to convey electrical current. In the open position, each of the main charger contactors 96 and the main battery contactors 98 is configured to interrupt (e.g., obstruct, prevent, etc.) electrical current. The main charger contactors 96 and the main battery contactors 98 may be configured as electrically-controlled relays or switches which may be controlled by an electrical control signal to position the main charger contactors 96 and the main battery contactors 98 in their respective closed position or open position. While the battery 70 of FIG. 4 includes two main battery contactors 98 (e.g., a positive contactor and a negative contactor), the present disclosure is not limited to the use of both a positive main battery contactor 98 and a negative main battery contactor 98 for the battery 70 (e.g., the battery 70 may include a positive main battery contactor 98 or a negative main battery contactor 98).

The main battery contactors 98 are connected in electrical communication (e.g., signal communication) with a controller 106. The controller 106 controls the main battery contactors 98 for positioning in their respective open positions or closed positions using the electrical control signal (e.g., an electrical control current, electronic signal, etc.). Operation of the controller 106 to effect positioning of the main battery contactors 98 in the open position or the closed position may be performed manually (e.g., by a pilot or other operator) or automatically (e.g., by the controller 106). The controller 106 is configured to control the positions of the main battery contactors 98 in the closed position and the open position independent of the battery monitoring system 72. The controller 106 may be formed by or otherwise part of an electronic engine controller (EEC) for the propulsion system 20 or its gas turbine engine 22. The EEC may control operating parameters of the gas turbine engine 22 such as, but not limited to, fuel flow, stator vane position (e.g., variable compressor inlet guide vane (IGV) position), compressor air bleed valve position, propeller rotation speed, propeller blade pitch, etc. so as to control an engine power and/or thrust of the propulsion system 20 or its gas turbine engine 22. The EEC may be part of a full authority digital engine control (FADEC) system for the propulsion system 20. Alternatively, the controller 106 may be a discrete controller directed to operation of the main battery contactors 98 (e.g., only for operation of the main battery contactors 98). The controller 106 may alternatively be formed by the battery monitoring system 72 where the battery monitoring system 72 is configured with multiple channels (e.g., multiple independent control systems). For example, a first channel of the battery monitoring system 72 may control positions of the string contactors 90, 92 while an independent second channel of the battery monitoring system 72 may control positions of the main battery contactors 98.

The battery monitoring system 72 of FIGS. 2-4 includes a processor 100 and memory 102. The memory 102 is in signal communication with the processor 100. The processor 100 may include any type of computing device, computational circuit, or any type of process or processing circuit capable of executing a series of instructions that are stored in the memory 102, thereby causing the processor 100 to perform or control one or more steps or other processes. The processor 100 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 102 may represent one or more algorithms for controlling and/or monitoring aspects of the battery assembly 68, and the stored instructions are not limited to any particular form (e.g., program files, system data, buffers, drivers, utilities, system programs, etc.) provided they can be executed by the processor 100. The memory 102 may be a non-transitory computer readable storage medium configured to store instructions that when executed by one or more processors, cause the one or more processors to perform or cause the performance of certain functions. The memory 102 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the battery monitoring system 72 may be achieved via the use of hardware, software, firmware, or any combination thereof. The battery monitoring system 72 may also include input and output devices (e.g., keyboards, buttons, switches, touch screens, video monitors, sensor readouts, data ports, etc.) that enable the operator to input instructions, receive data, etc.

The battery monitoring system 72 includes a plurality of sensors 104 to monitor operational parameters of the battery 70 including, but not limited to, voltage, current, temperature, electric arc detection, fire detection, and the like. For example, the battery monitoring system 72 may include one or more of the sensors 104 at (e.g., on, adjacent, or proximate) each battery module 74 to monitor the health of each battery module 74 and or to monitor operational parameters of each battery module 74 such as, but not limited to, voltage, current, and temperature. The battery monitoring system 72 may additionally include one or more sensors 104 for monitoring voltage and current parameters for each battery string 80, for the battery 70 (e.g., at the battery terminals 86, 88), and/or for the charger 94.

The battery monitoring system 72 is connected in electrical communication (e.g., signal communication) with the string contactors 90, 92. The battery monitoring system 72 may control the string contactors 90, 92 for positioning in their respective open positions or closed positions using the electrical control signal (e.g., an electrical control current, electronic signal, etc.). Similarly, the battery monitoring system 72 may be in electrical communication (e.g., signal communication) with the main charger contactors 96 control the main charger contactors 96 their respective open positions or closed positions. As previously discussed, the controller 106 is configured to control the positions of the main battery contactors 98 in the closed position or the open position independent of the battery monitoring system 72. In other words, the battery monitoring system 72 is not configured for (e.g., not capable of) controlling the positions of the main battery contactors 98 in the closed position or the open position.

The thermal management system 108 is configured to control (e.g., cool and/or heat) a thermal condition of the battery 70 in order to maintain the battery 70 within a selected operational temperature range. For example, the thermal management system 108 of FIG. 3 is configured to facilitate thermal management of each battery module 74. The thermal management system 108 may be configured as a ventilation system configured to provide cooling and/or heating air to the battery 70 and its battery strings 80 and battery modules 74. Alternatively, the thermal management system 108 may be configured to recirculate a liquid coolant medium (e.g., water) through the battery modules 74 to control a temperature of the battery modules 74. The thermal management system 108 may be connected in signal communication with the battery monitoring system 72. The battery monitoring system 72 may control the thermal management system 108 based, for example, on an output signal (e.g., a temperature output signal) from the sensors 104 for each battery module 74. For example, the battery monitoring system 72 may control the thermal management system 108 to increase or decrease a ventilation flow rate, cooling liquid flow rate, or alternative heating or cooling function based on the temperature output signal from the sensors 104 for each battery string 80 and/or each battery module 74. The battery monitoring system 72 may control the thermal management system 108 to provide cooling to a particular battery string 80 and/or battery module 74 based on the temperature out signal from one or more sensors 104 for that particular battery string 80 and/or battery module 74. For example, the thermal management system 108 may provide greater cooling (e.g., ventilation flow rate) to a first battery string 80 than to a second battery string 80.

Referring again to FIG. 2, the engine control system 23 includes a processor 110 and memory 112. The memory 112 is connected in signal communication with the processor 110. The processor 110 may include any type of computing device, computational circuit, or any type of process or processing circuit capable of executing a series of instructions that are stored in the memory 112, thereby causing the processor 110 to perform or control one or more steps or other processes. The processor 110 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory 112 may represent one or more algorithms for controlling aspects of the gas turbine engine 22, and the stored instructions are not limited to any particular form (e.g., program files, system data, buffers, drivers, utilities, system programs, etc.) provided they can be executed by the processor 110. The memory 112 may be a non-transitory computer readable storage medium configured to store instructions that when executed by one or more processors, cause the one or more processors to perform or cause the performance of certain functions. The memory 112 may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the engine control system 23 may be achieved via the use of hardware, software, firmware, or any combination thereof. The engine control system 23 may also include input and output devices (e.g., keyboards, buttons, switches, touch screens, video monitors, sensor readouts, data ports, etc.) that enable the operator to input instructions, receive data, etc.

As shown in FIG. 2, for example, the engine control system 23 is connected in signal communication with the electric motor 62. The engine control system 23 controls operation of the electric motor 62 to apply a rotational force to second rotational assembly 44 to facilitate rotation of the propeller 56 by the second rotational assembly 44. The engine control system 23, the battery monitoring system 72, and/or the controller 106 may be discrete electronic control systems. Alternatively, the engine control system 23, the battery monitoring system 72, and/or the controller 106 may be formed by a single electronic control system. Combinations of the engine control system 23, the battery monitoring system 72, and/or the controller 106 are referred to herein as the "control system."

The engine control system 23 may form or otherwise be part of an electronic engine controller (EEC) for the propulsion system 20 and its gas turbine engine 22. The EEC may control operating parameters of the gas turbine engine 22 including, but not limited to, fuel flow, stator vane position (e.g., variable compressor inlet guide vane (IGV) position), compressor air bleed valve position, propeller 56 rotation speed, propeller 56 blade pitch, etc. so as to control an engine power and/or thrust of propulsion system 20. In some embodiments, the EEC may be part of a full authority digital engine control (FADEC) system for the propulsion system 20.

Figure 5:
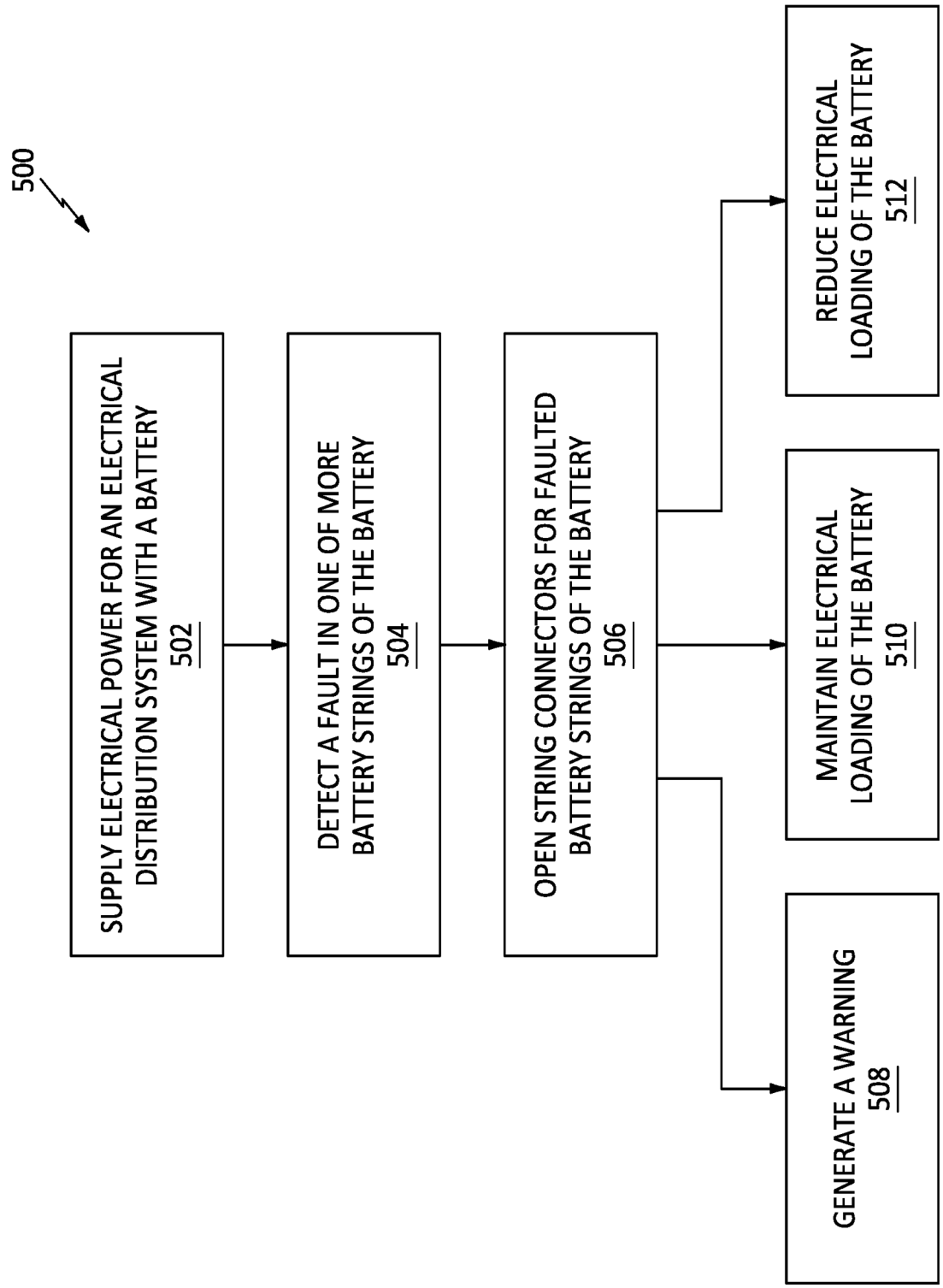
FIG. 5 illustrates a block diagram depicting a method for charging a battery including a plurality of battery strings, in accordance with one or more embodiments of the present disclosure.

Referring to FIGS. 4 and 5, a Method 500 for operating an aircraft electrical distribution system in response to an identified battery fault. FIG. 5 illustrates a flowchart for the Method 500. The Method 500 may be performed for the battery assembly 68, as described herein. The battery monitoring system 72 and/or the controller 106 may be used to execute or control one or more steps of the Method 500 for the battery assembly 68. For example, the processor 100 may execute instructions stored in memory 102, thereby causing the battery monitoring system 72 and/or its processor 100 to execute or otherwise control one or more steps of the Method 500. However, it should be understood that the Method 500 is not limited to use with the battery assembly 68 described herein. Unless otherwise noted herein, it should be understood that the steps of Method 500 are not required to be performed in the specific sequence in which they are discussed below and, in some embodiments, the steps of Method 500 may be performed separately or simultaneously.

Step 502 includes supplying electrical power to the electrical distribution bus 66 with the battery 70. For example, the one or more battery strings 80 (e.g., on-service battery strings) of the plurality of battery strings 80 may be electrically connected to the electrical distribution bus 66 with the main battery contactors 98 and the string contactors 90, 92 for the one or more battery strings 80 of the plurality of battery strings 80 in the closed position. As shown in FIG. 4, for example, the battery 70 may supply electrical power to the electric motor 62, thereby causing the electric motor 62 to provide all or a portion of the rotational force for rotation of the second rotational assembly 44 (see FIG. 2).

Step 504 includes detecting a fault (e.g., electrical faults) in the electrical distribution system 24. For example, Step 504 may include detecting a fault or other failure in one or more battery strings 80 and/or one or more battery modules 74. The battery monitoring system 72 may detect or otherwise identify the fault. For example, the battery monitoring system 72 may detect the fault based on battery string 80 and/or battery module 74 parameters measured by the plurality of sensors 104. Examples of faults include, but are not limited to, an electric arc (e.g., an arc discharge), an electrical current spike, a short circuit condition, high battery module 74 temperature, and fire (e.g., electrical fire).

Step 506 includes opening the positive string contactor 90 and/or the negative string contactor 92 for one or more of the battery strings 80 of the battery 70 in response to the detected fault (see Step 504). Opening the positive string contactor 90 and/or the negative string contactor 92, as previously discussed, may facilitate electrical isolation of faulted battery strings 80 from the electrical distribution bus 66 as well as remaining (e.g., unfaulted) battery strings 80. The positive string contactor 90 and/or the negative string contactor 92 for each faulted battery string 80 may be positioned in their open positions by the battery monitoring system 72. Opening only the string contactors 90, 92 for the faulted battery strings 80 may allow unfaulted battery strings 80 of the battery 70 to continue to provide electrical power to the electrical distribution bus 66 for aircraft 1000 and/or propulsion system 20 operation (see FIGS. 1 and 2). Opening of the positive string contactor 90 and/or the negative string contactor 92 for one or more of the faulted battery strings 80 may cause an increase in electrical loading (e.g., electrical power output) of the unfaulted battery strings 80 which remain connected in electrical communication with the electrical distribution bus 66 assuming, for example, a substantially constant electrical load on the electrical distribution bus 66. In some cases, this increased electrical load on the unfaulted battery strings 80 may cause one or more of the unfaulted battery strings 80 to approach or exceed one or more operational parameter limits such as, but not limited to, a thermal limit (e.g., a high temperature limit), a high electrical current limit for the respective battery string 80, or a high electrical current limit for the positive string contactor 90 and/or the negative string contactor 92 for the respective battery string 80.

Step 508 may include, optionally, generating (e.g., with the battery monitoring system) a warning (e.g., an audible alarm, a warning light, a warning message, etc.) for a pilot or other aircraft operator. The warning may identify one or more operational parameter limits for the battery 70 and/or its battery strings 80. Routine experimentation may be performed by a person of ordinary skill in the art to determine suitable operational parameter limits for the battery 70 in accordance with and as informed by one or more aspects of the present disclosure. The warning may include, for example, an instruction to the pilot or other aircraft operator to reduce electrical loading of the battery 70 to prevent exceeding one or more operational parameter limits for the battery 70. The warning may include, for example, an instruction to the pilot or other aircraft operator to reduce electrical loading of the battery 70 to reduce an operational parameter of the battery 70 and/or its battery strings 80 to below the one or more operational parameter limits for the battery 70. The battery monitoring system 72 may identify one or more operational parameter limits for the battery 70. For example, the battery monitoring system 72 may identify an electrical loading limit for the battery 70. The electrical loading limit may be based, at least in part, on a number of the battery strings 80 (e.g., unfaulted battery strings 80) which are connected in electrical communication with the electrical distribution bus 66. The electrical loading limit may be based on predetermined electrical loading limits (e.g., electrical current limits) for the battery modules 74, the battery strings 80, and/or the string contactors 90, 92. Alternatively, the electrical loading limit may be dynamically determined based on operational conditions of the battery 70 and/or the electrical distribution bus 66 such as, but not limited to, battery module 74 temperatures, electrical distribution bus 66 voltage, and/or battery string 80 voltage.

Additionally or alternatively, the battery monitoring system 72 may generate a warning indicating a high-temperature caution threshold for the battery 70 (e.g., an unfaulted battery string 80 or one or more of its battery modules 74) has been exceeded. For example, the battery monitoring system 72 may identify, using a temperature output signal from the sensors 104, that a measured temperature of the battery 70 or its components 74, 80 has exceeded a high-temperature caution threshold for the battery 70. The high-temperature caution threshold may be a predetermined temperature value. Alternatively, the high-temperature caution threshold may be dynamically determined based, for example, one or more operating conditions of the aircraft 1000 (see FIG. 1) which may be determined to affect battery 70 operating temperatures such as, but not limited to, flight condition (e.g., aircraft 1000 speed, aircraft 1000 rate of climb, etc.), aircraft 1000 external temperature, and the like. High-temperature caution threshold values may be selected to provide a warning to a pilot or other aircraft operator to prevent or reduce the likelihood of the battery 70 component 74, 80 temperature(s) exceeding an operating temperature limit (e.g., a manufacturer's operating temperature limit, a temperature limit associated with thermal runaway, a temperature limit at which exothermic chemical reactions may occur in a fully charged battery cell, etc.). As previously discussed, the electrical isolation of one or more faulted battery strings 80 may cause the remaining unfaulted battery strings 80 to experience an increased electrical current load to supply electrical loads of the electrical distribution bus 66 (e.g., the electric motor 62), thereby increasing heat generation in the unfaulted battery strings 80. In response to identification and/or electrical isolation of the faulted battery strings 80, the battery monitoring system 72 may determine an elevated high-temperature caution threshold for the unfaulted battery strings 80 and/or their battery modules 74, which elevated high-temperature caution threshold is greater than a previously identified high-temperature caution threshold for the respective battery strings 80 and/or their battery modules 74 prior to identification of one or more faulted battery strings 80. This elevated high-temperature caution threshold may account for increased expected heat generation in the unfaulted battery strings 80 while still providing a suitable margin to battery 70 temperature operating limits. Determination of the elevated high-temperature caution threshold may be based on, for example, one or more operating conditions of the aircraft 1000 (see FIG. 1) as discussed above, a number of identified faulted battery strings 80, a number of unfaulted battery strings 80 (e.g., battery strings 80 electrically connected to the electrical distribution bus 66), and battery temperature operating limits. Routine experimentation may be performed by a person of ordinary skill in the art to determine suitable high-temperature caution thresholds and elevated high-temperature caution thresholds for the battery 70 and its components 74, 80 in accordance with and as informed by one or more aspects of the present disclosure. For example, suitable high-temperature caution thresholds and elevated high-temperature caution thresholds may be determined by analysis, simulation, and/or testing, and will vary based on battery configurations, electrical distribution system configurations, aircraft configurations, etc.

The battery monitoring system 72 may determine a battery capacity (e.g., available electrical energy) of the battery 70 based on a number of the battery strings 80 (e.g., unfaulted battery strings 80) which are connected in electrical communication with the electrical distribution bus 66. In other words, the battery monitoring system 72 may determine a reduced battery capacity of the battery 70 based on isolation of the faulted battery strings 80 from the electrical distribution bus 66. The battery monitoring system 72 may determine an electrical power requirement for a flight plan (e.g., a remainder of the current flight) of the aircraft 1000 (see FIG. 1). The battery monitoring system 72 may determine, based on the electrical power requirement for the flight plan and the reduced battery capacity of the battery 70, that the flight plan should be modified to reduce an electrical power requirement for the flight plan. The battery monitoring system 72 may provide a notification or warning to the pilot or other operator of the aircraft of the reduced battery capacity of the battery 70 and/or the modified flight plan.

Step 510 may include, optionally, controlling the electrical distribution system 24 to maintain an electrical loading of the battery 70. For example, Step 510 may include controlling the electrical distribution system 24 to maintain an electrical loading of the battery 70 substantially constant and, thereby, increasing an electrical loading of each of the one or more unfaulted battery strings 80 (e.g., in comparison to the battery 70 before isolation of the one or more faulted battery strings 80). The battery monitoring system 72 may control the thermal management system 108 to increase the cooling (e.g., cooling medium flow) to the unfaulted battery strings 80 and their battery modules 74 to prevent or reduce the likelihood of the unfaulted battery strings 80 and/or their battery modules 74 from exceeding a high-temperature limit due to the increase electrical loading.

Step 512 may include, optionally, controlling the electrical distribution system 24 to reduce an electrical loading of the battery 70. For example, the battery monitoring system 72 may deenergize or reduce an electrical power requirement of one or more electrical loads of the electrical distribution bus 66. The battery monitoring system 72 may reduce electrical loading of the battery 70 below the determined electrical loading limit for the unfaulted battery strings 80 (see Step 508). The control system (e.g., the battery monitoring system 72 and/or the engine control system 23) may control the electric motor 62 to decrease an electrical loading of the electric motor 62 on the battery 70 (e.g., decrease an amount of rotational force applied by the electric motor 62 to the second shaft 52). The control system may control the gas turbine engine 22 to increase an engine power of the gas turbine engine 22 as determined based on an operational parameter of the gas turbine engine 22 such as, but not limited to, a measured rotation speed of the first shaft 46, a measured fuel flow rate to the combustor 30, a measured turbine temperature (e.g., an inlet temperature or an outlet temperature of the high-pressure turbine 32). For example, the control system may maintain a substantially constant propulsion of the propulsion system 20 by shifting all or a portion of the mechanical loading of the propeller 56 from the electric motor 62 to the gas turbine engine 22.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft, the assembly comprising:
an aircraft electrical distribution bus;
a battery including a plurality of battery strings and a main battery contactor,
the plurality of battery strings electrically connected in parallel, each battery string including a string contactor, the string contactor positionable in a closed string position or an open string position, the string contactor in the closed string position configured to direct electrical power from the respective battery string to the aircraft electrical distribution bus, the string contactor in the open string position configured to electrically isolate the respective battery string from the aircraft electrical distribution bus, and
the main battery contactor electrically connected in series with the string contactor of each battery string, the main battery contactor positionable in a closed battery position or an open battery position, the main battery contactor in the closed battery position configured to direct electrical power from the battery to the aircraft electrical distribution bus, the main battery contactor in the open battery position configured to electrically isolate the battery from the aircraft electrical distribution bus;

a thermal management system for the battery, the thermal management system configured to direct a cooling medium to each battery string of the plurality of battery strings; and a control system in signal communication with the string contactor of each battery string, the control system configured to control a position of the string contactor of each battery string in the closed string position or the open string position, the control system including a processor in communication with a non-transitory memory storing instructions, which instructions when executed by the processor, cause the processor to:

detect a fault in a faulted first battery string of the plurality of battery strings;

position the string contactor of the faulted first battery string in the open string position, in response to the detected fault in the faulted first battery string, and maintain the string contactor of at least one unfaulted second battery string of the plurality of battery strings in the closed string position; and control the thermal management system to increase a flow rate of the cooling medium to the at least one unfaulted second battery string in response to detection of the fault in a faulted first battery string.

2. The assembly of claim 1, wherein control of a position of the main battery contactor in the closed battery position and the open battery position is independent of the control system.

3. The assembly of claim 1, wherein the instructions, when executed by the processor, further cause the processor to determine an electrical loading limit for the at least one unfaulted second battery string with the string contactor of the faulted first battery string in the open string position.

4. The assembly of claim 3, wherein the instructions, when executed by the processor, further cause the processor to generate a warning identifying the determined electrical loading limit.

5. The assembly of claim 1, wherein the instructions, when executed by the processor, further cause the processor to decrease an electrical loading of the aircraft electrical distribution bus in response to detection of the fault in a faulted first battery string.

6. The assembly of claim 1, wherein each battery string includes a plurality of battery modules electrically connected in series.

7. A method for operating an electrical distribution system for an aircraft, the method comprising:

supplying electrical power to an aircraft electrical distribution bus with a battery, the battery including a plurality of battery strings and a main battery contactor, each battery string including a string contactor electrically connected in series with the main battery contactor;

detecting a fault in at least one faulted first battery string of the plurality of battery strings;

positioning the string contactor of the faulted first battery string in an open string position, in response to the detected fault in the faulted first battery string, and maintaining the string contactor of at least one unfaulted second battery string of the plurality of battery strings in a closed string position; and determining, with a control system, an electrical loading limit for the at least one unfaulted second battery string with the string contactor of the at least one faulted first battery string in the open string position.

8. The method of claim 7, wherein the plurality of battery strings are electrically connected in parallel.

9. The method of claim 7, further comprising generating, with the control system, a warning identifying the determined electrical loading limit.

10. The method of claim 9, further comprising decreasing, with the control system, an electrical loading of the aircraft electrical distribution bus in response to detection of the fault in a faulted first battery string.

11. An assembly for an aircraft, the assembly including:
an aircraft electrical distribution bus;
an aircraft propulsion system including a rotational assembly, the rotational assembly including a rotatable shaft and an electric motor, the electric motor connected in electrical communication with the aircraft electrical distribution bus and configured to selectively drive the rotatable shaft;
a battery including a plurality of battery strings and a main battery contactor,
each battery string including a string contactor, the string contactor positionable in a closed string position or an open string position, and
the main battery contactor electrically connected in series with the string contactor of each battery string, the main battery contactor positionable in a closed battery position or an open battery position; and
a control system in signal communication with the string contactor of each battery string, the control system configured to control a position of the string contactor of each battery string in the closed string position or the open string position, the control system including a processor in communication with a non-transitory memory storing instructions, which instructions when executed by the processor, cause the processor to:
detect a fault in a faulted first battery string of the plurality of battery strings;
position the string contactor of the faulted first battery string in the open string position, in response to the detected fault in the faulted first battery string, and maintain the string contactor of at least one unfaulted second battery string of the plurality of battery strings in the closed string position; and
determine an electrical loading limit for the at least one unfaulted second battery string with the string contactor of the faulted first battery string in the open string position.

12. The assembly of claim 11, wherein the instructions, when executed by the processor, further cause the processor to control the electric motor to decrease an electrical loading of the electric motor in response to detection of the fault in the faulted first battery string.

13. The assembly of claim 12, wherein:
the propulsion system includes a gas turbine engine, the gas turbine engine including the rotational assembly; and
the instructions, when executed by the processor, further cause the processor to control the gas turbine engine to increase an engine power of the gas turbine engine in response to detection of the fault in a faulted first battery string.

14. The assembly of claim 13, wherein the rotational assembly further includes a propeller, the electric motor configured to selectively drive the propeller via the rotatable shaft.

15. The assembly of claim 13, wherein the gas turbine engine includes a generator connected in electrical communication with the aircraft electrical distribution bus.

16. The assembly of claim 15, wherein the gas turbine engine includes a second rotational assembly including a second rotatable shaft, a bladed turbine rotor, and a bladed compressor rotor, the second rotatable shaft interconnecting the bladed turbine rotor and the bladed compressor rotor, the bladed turbine rotor configured to drive the generator via the second rotatable shaft.

17. The assembly of claim 13, wherein each battery string of the plurality of battery strings includes a plurality of battery modules electrically connected in series and the plurality of battery strings are electrically connected in parallel.

\* \* \* \* \*